Nov. 18, 1969  C. E. BURFORD  3,478,998
BAKING PAN

Filed June 29, 1967  2 Sheets-Sheet 1

INVENTOR.
CHARLES E. BURFORD
BY
Browne, Schuyler and Beveridge
ATTORNEYS

INVENTOR.
CHARLES E. BURFORD
BY
Browne, Schuyler and Beveridge
ATTORNEYS

United States Patent Office 3,478,998
Patented Nov. 18, 1969

3,478,998
BAKING PAN
Charles E. Burford, 2330 Republic Bank Tower,
Dallas, Tex. 75201
Filed June 29, 1967, Ser. No. 649,987
Int. Cl. B28b 7/24
U.S. Cl. 249—120         14 Claims

ABSTRACT OF THE DISCLOSURE

A baking pan assembly includes a plurality of pans each of which has a triangular transverse cross section defined in part by a vertical side wall and another side wall which is inclined at approximately a forty-five degree angle.

---

This invention is directed to a baking pan or tray which is capable of forming loaves of bread or other foods in the general shape of a triangular prism.

Baking pans of triangular transverse cross section have been devised in the past in order to produce food products which have equilateral triangular cross sections. These prior art pans have had their intersecting side walls tapered inwardly at equal angles of inclination so that they intersect at a line which is located at the longitudinal centerline of the pan.

Such prior art pans have been incapable of forming products in which there is a ninety degree or right angle disposition between two of the lateral sides of the product. Therefore, the prior art products cannot be nested together to entirely fill a standard rectangular box, crate or basket. When the product is bread, a pair of sandwiches made of equilaterally shaped slices cannot be fitted together to form a square configuration to fit conveniently into a sandwich bag.

The present invention has as one of its principal objects the provision of a tray or pan which is capable of forming bread other foods so that it will have a triangular cross section in which two sides lie at right angles to each other. Another important object is to provide for a maximum efficient usage of the space available within a given horizontal area in the pan or in a baking oven. A further object is to provide a simple multiple pan unit in which the pans are interconnected in a novel manner.

This invention involves a baking pan or tray which has a rectangular rim portion and depending end and side walls. One of the side walls is perpendicular to the rim portion and the other of the side walls is inclined inwardly. Preferably the two side walls intersect to form an included angle of approximately forty-five degrees.

Another aspect of the invention relates to the manner in which a plurality of pans are supported within a pair of similarly configured endless rectangular bands. At least some of the pans are connected to both of the endless rectangular bands. At least some of the pans are connected to both of the endless bands in order to provide a simple, rigid and effective assembly.

A particular advantage of this invention is that it permits a maximum efficient utilization of a given horizontal area in a baking pan or oven. It will be realized that this advantage is a direct result of the use of a single vertical side wall and an inclined side wall which meet at a line of intersection transversely offset from the longitudinal centerline of the pan. If, as in the piror art, this intersection of the side walls were at the center of the pan, their angle of intersection would have to be ninety degrees and the depth-to-width ratio of the pan would be quite low, thus resulting in an inficient use of a pan or oven which has limited horizontal dimensions.

The drawing and the following description are directed to a single preferred embodiment of the invention. It is contemplated that many variations thereto may be devised in accordance with the teachings of this specification.

Figure 1:
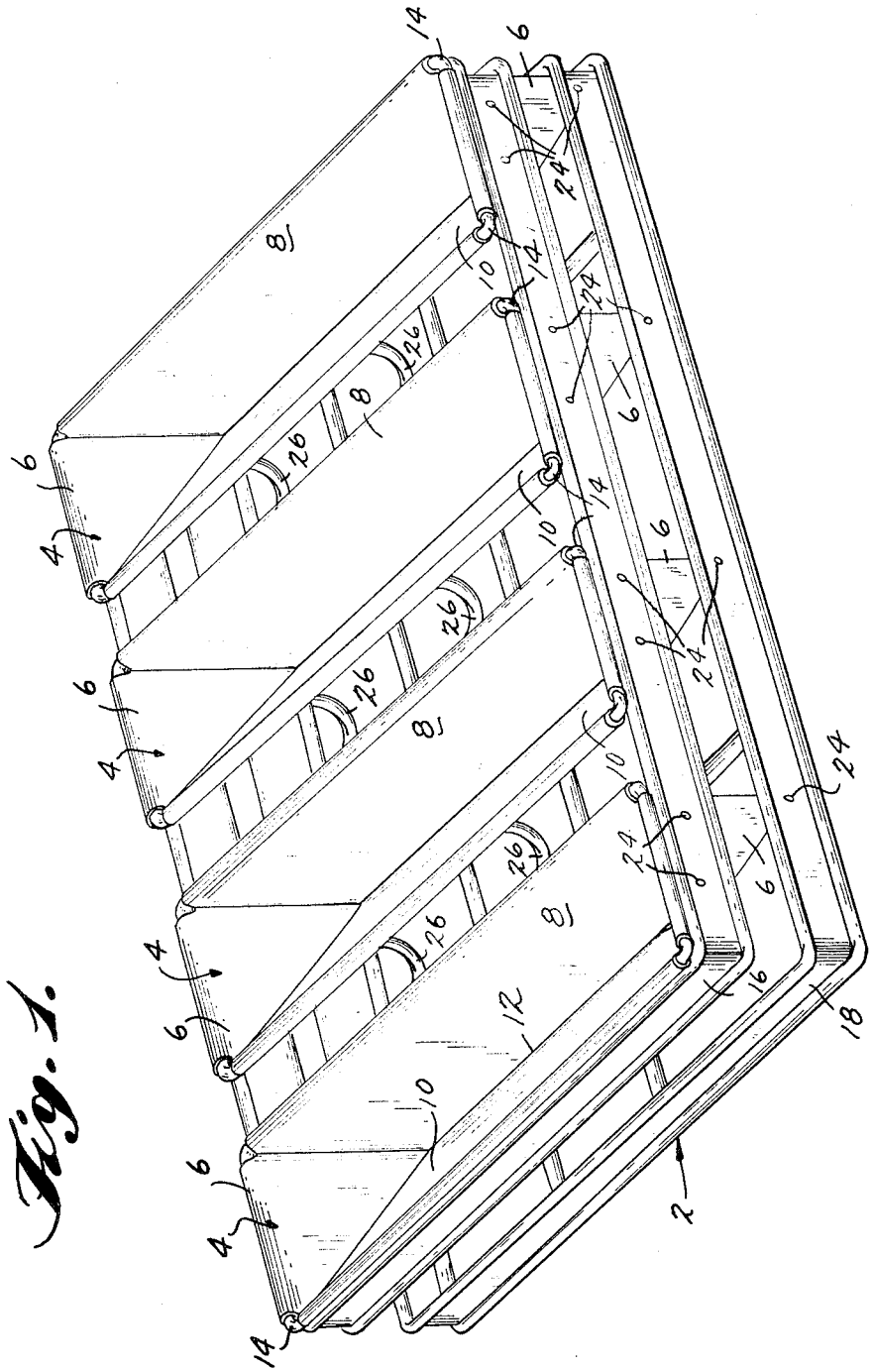
FIG. 1 is a perspective view of an assembly which incorporates four baking pans constructed in accordance with this invention.

It will be seen in FIG. 1 that the baking pan assembly includes a framework 2 which includes and supports a series of four baking pans 4. Each of the pans has an open top defined by a quadrilateral rim which has parallel pairs of opposite edges. End walls 6 depend from opposite edges of the upper rim of each of the pans.

Figure 4:
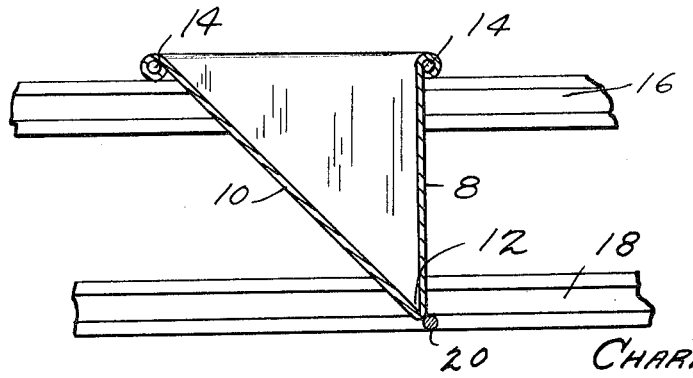
FIG. 4 is a transverse sectional view of a single pan of the type shown in FIG. 1.

As shown in FIG. 4, the transverse cross section of each pan is substantially V-shaped and defined by the side walls 8 and 10. The side wall 8 is vertical and normal to the upper rim portion of the pan. The side wall 10 is inclined from the plane of the upper rim in a direction toward the side wall 8. The angle of inclination of the side wall 10 to the upper rim and to the side wall 8 is preferably forty-five degrees and it may be in the range from forty to fifty degrees. These walls 8 and 10 meet at an apex or line of intersection 12 which may be suitably rounded if desired. Preferably, the transverse distance between the edges of the upper rim of each pan is equal to the transverse extent of the vertical side wall 8.

The upper rim of each pan 4 is rolled outwardly at its four edges to at least partially encircle a rectangular reinforcing wire 14 which has its corners exposed in the manner shown in FIG. 1. Arcuate rods 26 are connected to the rim reinforcing wires 14 in order to interconnect the several pans 4.

The framework 2 which supports and interconnects the pans 4 includes a pair of generally flat bands 16 and 18 which are bent into a generally rectangular shape. The edges of each band may be beaded as shown to provide additional strength.

Figure 2:
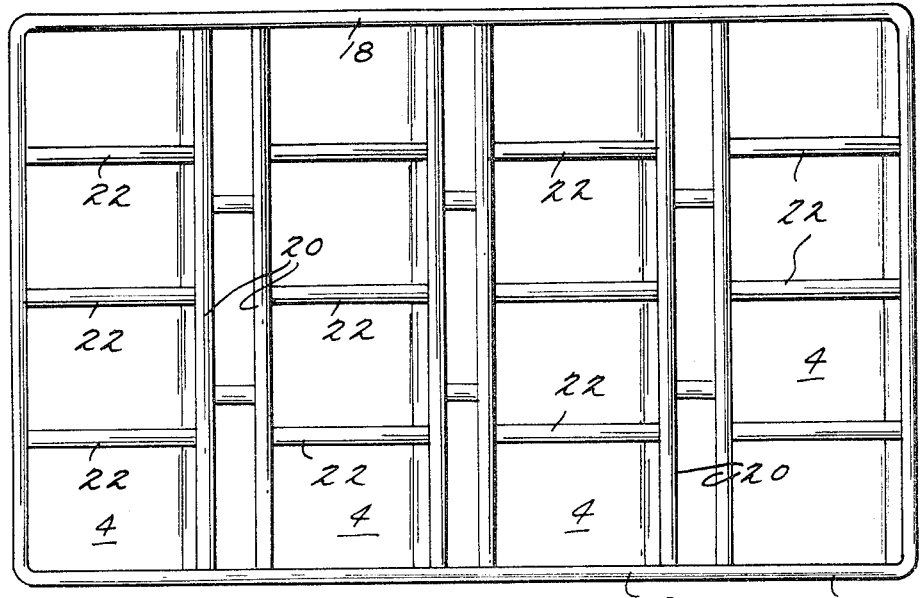
FIG. 2 is a bottom view, looking upwardly at the assembly illustrated in FIG. 1.
Figure 3:
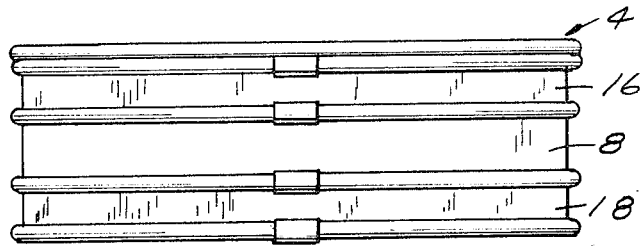
FIG. 3 is an end view of the assembly shown in FIG. 1.

The lower band 18 is reinforced by a grille structure shown in FIG. 2 which includes a series of four rectangular members 20 which carry spanning reinforcing rods 22. At least the short edge portions of the rectangular members 20 fit within the beaded rim of the lower band 18 and are spot welded thereto in order to provide rigidity to the entire structure.

The pans 4 themselves provide the connection between the two bands 16 and 18. The end walls 6 of each of the pans is spot welded at 24 to both of the bands 16 and 18 to unify the entire structure.

From the foregoing description, it will be appreciated that the present invention provides a simple and useful baking pan which is capable of producing products of isosceles triangular transverse cross section in which one of the angles is a 90 degree angle. Baking pans made in accordance with the invention may assume various forms having constructional differences from the illustrated and preferred embodiment. The scope of the invention is not limited only to pans which resemble those described above, but may assume various forms and shapes which fall within the terms and the spirit of the following claims.

What is claimed is:

1. A baking pan comprising a quadrilateral rim portion with two pair of opposite edges, a pair of end walls depending from one said pair of opposite edges, a pair of side walls depending from another said pair of opposite edges, a first of said side walls depending from said rim portion in a direction substantially normal to said rim portion, and a second of said side walls depending from said rim portion in a direction inclined to said rim portion in a direction toward said first of said side walls.

2. A baking pan according to claim 1 in which said side walls meet at a line of intersection.

3. A baking pan according to claim 2 in which the distance between said another pair of opposite edges is equal to the dimension of said first of said side walls measured perpendicular to said line of intersection.

4. A baking pan according to claim 3 in which said second of said side walls is inclined approximately forty-five degrees with respect to said rim portion.

5. A baking pan according to claim 3 associated with and connected to a plurality of identical baking pans.

6. A baking pan according to claim 1 in which said second of said side walls is inclined approximately forty-five degrees with respect to said rim portion.

7. A baking pan according to claim 6 in which said side walls meet at a line of intersection.

8. A baking pan according to claim 7 connected to a plurality of identical baking pans.

9. A baking pan having a transverse cross section in the shape of an isosceles triangle which is defined by an upper rim portion and side wall portions in which said upper rim portion is horizontal and one of said side wall portions is vertical.

10. A baking pan according to claim 9 connected to a plurality of identical trays.

11. A baking pan assembly comprising a first endless flat band of rectangular shape, a second endless flat band which has a rectangular shape geometrically identical to said first endless flat band, a plurality of pans each lying within the confines of both said bands, means connecting at least some of said pans to both of said bands, each of said pans having a vertical side wall and an inwardly inclined side wall opposing said vertical side wall.

12. A baking pan assembly according to claim 11 in which the vertical side wall and the inclined side wall of each pan meet at a line of intersection.

13. A baking pan assembly according to claim 12 in which the relative inclination between the vertical side wall and the inclined side wall is approximately forty-five degrees.

14. A baking pan assembly according to claim 13 having a reinforcing grille connected to and located within the confines of the first endless flat band, each of said pans having a rim reinforcing member located within its upper rim, and means interconnecting all of said rim reinforcing members.

References Cited

UNITED STATES PATENTS

| | | | |
|---|---|---|---|
| 545,216 | 8/1895 | Willey | 249—117 |
| 776,777 | 12/1904 | Dietz | 249—120 X |
| 1,017,026 | 2/1912 | Van Hook | 249—119 X |
| 1,134,653 | 4/1915 | Weed | 249—120 X |
| 1,260,105 | 3/1918 | Watson | 249—119 |
| 1,461,974 | 7/1923 | Driver | 249—117 |
| 1,516,232 | 11/1924 | Kratzer | 249—120 X |
| 1,592,066 | 7/1926 | Barnes | 249—120 |
| 1,675,599 | 7/1928 | Copeman | 249—120 |
| 1,875,256 | 8/1932 | Nagel | 249—120 |
| 2,053,926 | 9/1936 | Suiter | 249—120 X |
| 2,243,363 | 5/1941 | Thomas | 249—120 |
| 2,283,032 | 5/1942 | Baxter et al. | 249—120 |

J. HOWARD FLINT, JR., Primary Examiner

U.S. Cl. X.R.

249—117